US009479424B2

(12) United States Patent
Chunduri et al.

(10) Patent No.: US 9,479,424 B2
(45) Date of Patent: Oct. 25, 2016

(54) OPTIMIZED APPROACH TO IS-IS LFA COMPUTATION WITH PARALLEL LINKS

(71) Applicant: Telefonaktiebolaget L M Ericsson (publ), Stockholm (SE)

(72) Inventors: Uma S. Chunduri, Fremont, CA (US);
Vasant S. Patil, San Jose, CA (US);
Wenhu Lu, San Jose, CA (US);
Evgeny Tantsura, Palo Alto, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 319 days.

(21) Appl. No.: 14/218,540

(22) Filed: Mar. 18, 2014

(65) Prior Publication Data
US 2015/0271056 A1   Sep. 24, 2015

(51) Int. Cl.
H04L 12/721    (2013.01)
H04L 12/751    (2013.01)
H04L 12/801    (2013.01)
H04L 12/705    (2013.01)
H04L 12/707    (2013.01)
H04L 12/703    (2013.01)

(52) U.S. Cl.
CPC ............. *H04L 45/127* (2013.01); *H04L 45/02* (2013.01); *H04L 45/18* (2013.01); *H04L 45/22* (2013.01); *H04L 45/24* (2013.01); *H04L 47/17* (2013.01); *H04L 45/12* (2013.01); *H04L 45/28* (2013.01)

(58) Field of Classification Search
None
See application file for complete search history.

(56) References Cited

U.S. PATENT DOCUMENTS 8,165,121 B1 * 4/2012 Singh .................. H04L 45/28
370/251

OTHER PUBLICATIONS

Bryant, et al., "Remote LFA FRR, draft-ieff-rtgwg-remote-lfa-04," Network Working Group Internet-Draft, Internet Engineering Task Force (IETF), Nov. 22, 2013, 23 pages.
Callon, R. , "Use of OSI IS-IS for Routing in TCP/IP and Dual Environments", txt, Digital Equipment Corp, Dec. 1990, 80 pages.
Atlas, A. , et al., "Basic Specification for IP Fast Reroute: Loop-Free Alternative", RFC:5286; Sep. 2008; Standards Tracks; 31 pages.
Bryant, S. , et al., "Remote LFR FRR draft-ietf-rtgwg-remote-lfa-03", Nov. 4, 2013, 23 pages.
Postel, "User Datagram Protocol," Aug. 28, 1980, 3 pages, Network Working Group, Request for Comments: 768.
Postel, "DARPA Internet Program Protocol Specification," Sep. 1981, 50 pages.
"Transmission Control Protocol, DARPA Internet Program Protocol Specification," Sep. 1981, 91 pages, Network Working Group, Request for Comments: 793.
Hedrick, "Routing Information Protocol," Jun. 1988, 33 pages, Network Working Group, Request for Comments: 1058.
(Continued)

*Primary Examiner* — Vinncelas Louis
(74) *Attorney, Agent, or Firm* — Nicholson De Vos Webster & Elliott, LLP

(57) ABSTRACT

A method is executed by a network device to a calculate loop free alternative (LFA) for each node in an intermediate system-intermediate system (IS-IS) area or IS-IS domain where the network device is connected with other nodes via multiple parallel links. The method includes a shortest path first (SPF) computation of the primary paths for the network device that tracks directly connected links from each node in the IS-IS area or IS-IS domain to the network device which is a source node for the SPF. These tracked links can then be utilized in subsequent LFA computations to avoid unnecessary calculations.

17 Claims, 10 Drawing Sheets

(56) References Cited

OTHER PUBLICATIONS

Oran, "OSI IS-IS Intra-domain Routing Protocol," Feb. 1990, 157 pages, Network Working Group, Request for Comments: 1142.
Socolofsky, et al., "A TCP/IP Tutorial," Jan. 1991, 28 pages, Network Working Group, Request for Comments: 1180.
Malkin, et al., "RIPng for IPv6," Jan. 1997, 19 pages, Network Working Group, Request for Comments: 2080.
Braden, et al., "Resource ReSerVation Protocol (RSVP)—Version 1 Functional Specification," Sep. 1997, 112 pages, Network Working Group, Request for Comments: 2205.
Wroclawski, "The Use of RSVP with IETF Integrated Services," Sep. 1997, 33 pages, Network Working Group, Request for Comments: 2210.
Wroclawski, "Specification of the Controlled-Load Network Element Service," Sep. 1997, 19 pages, Network Working Group, Request for Comments: 2211.
Shenker, et al., "Specification of Guaranteed Quality of Service," Sep. 1997, 20 pages, Network Working Group, Request for Comments: 2212.
Moy, "OSPF Version 2," Apr. 1998, 244 pages, Network Working Group, Request for Comments: 2328, The Internet Society.
Malkin, et al., "RIPng for IPv6," Network Working Group, Request for Comments: 2080, Jan. 1997, 19 pages.
Deering, et al., "Internet Protocol, Version 6 (IPv6) Specification," Dec. 1998, 39 pages, Network Working Group, Request for Comments: 2460, The Internet Society.
Nichols, et al., "Definition of the Differentiated Services Field (DS Field) in the IPv4 and IPv6 Headers," Dec. 1998, 20 pages, Network Working Group, Request for Comments: 2474, The Internet Society.
Blake, et al., "An Architecture for Differentiated Services," Dec. 1998, 36 pages, Network Working Group, Request for Comments: 2475, The Internet Society.
Heinanen, et al., "Assured Forwarding PHB Group," Jun. 1999, 11 pages, Network Working Group, Request for Comments: 2597, The Internet Society.
Borman, et al., "IPv6 Jumbograms," Aug. 1999, 9 pages, Network Working Group, Request for Comments: 2675, The Internet Society.
Black, "Differentiated Services and Tunnels," Oct. 2000, 14 pages, Network Working Group, Request for Comments: 2983, The Internet Society.
Thaler, et al., "Multipath Issues in Unicast and Multicast Next-Hop Selection," Nov. 2000, 9 pages, Network Working Group, Request for Comments: 2991, The Internet Society.
Hopps, "Analysis of an Equal-Cost Multi-Path Algorithm," Nov. 2000, 8 pages, Network Working Group, Request for Comments: 2992, The Internet Society.
Nichols, et al., "Definition of Differentiated Services Per Domain Behaviors and Rules for their Specification," Apr. 2001, 24 pages, Network Working Group, Request for Comments: 3086, The Internet Society.
Black, et al., "Per Hop Behavior Identification Codes," Jun. 2001, 8 pages, Network Working Group, Request for Comments: 3140, The Internet Society.
Awduche, et al., "RSVP-TE: Extensions to RSVP for LSP Tunnels," Dec. 2001, 61 pages, Network Working Group, Request for Comments: 3209, The Internet Society.
Davie, et al., "An Expedited Forwarding PHB (Per-Hop Behavior)," Mar. 2002, 16 pages, Network Working Group, Request for Comments: 3246, The Internet Society.
Charny, et al., "Supplemental Information for the New Definition of the EF PHB (Expedited Forwarding Per-Hop Behavior)," Mar. 2002, 24 pages, Network Working Group, Request for Comments: 3247, The Internet Society.

Grossman, "New Terminology and Clarifications for Diffserv," Apr. 2002, 10 pages, Network Working Group, Request for Comments: 3260, The Internet Society.
Baker, et al., "Management Information Base for the Differentiated Services Architecture," May 2002, 116 pages, Network Working Group, Request for Comments: 3289, The Internet Society.
Bernet, et al., "An Informal Management Model for Diffserv Routers," May 2002, 56 pages, Network Working Group, Request for Comments: 3290, The Internet Society.
Chan, et al., "Differentiated Services Quality of Service Policy Information Base," Mar. 2003, 96 pages, Network Working Group, Request for Comments: 3317, The Internet Society.
Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.
Kompella, et al., "Procedures for Modifying the Resource reSerVation Protocol (RSVP)," Oct. 2004, 7 pages, Network Working Group, Request for Comments: 3936, The Internet Society.
Fenner, et al., "Management Information Base for the User Datagram Protocol (UDP)," Jun. 2005, 19 pages, Network Working Group, Request for Comments: 4113, The Internet Society.
Rekhter, et al., "A Border Gateway Protocol 4 (BGP-4)," Jan. 2006, 104 pages, Network Working Group, Request for Comments: 4271, The Internet Society.
Kent, et al., "Security Architecture for the Internet Protocol," Dec. 2005, 101 pages, Network Working Group, Request for Comments: 4301, The Internet Society.
Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
Rosen, et al., "BGP/MPLS IP Virtual Private Networks (VPNs)," Feb. 2006, 47 pages, Network Working Group, Request for Comments: 4364, The Internet Society.
Polk, et al., "A Resource Reservation Protocol (RSVP) Extension for the Reduction of Bandwidth of a Reservation Flow," May 2006, 21 pages, Network Working Group, Request for Comments: 4495, The Internet Society.
Ali, et al., "Node-ID Based Resource Reservation Protocol (RSVP) Hello: A Clarification Statement," Jun. 2006, 7 pages, Network Working Group, Request for Comments: 4558, The Internet Society.
Babiarz, et al., "Configuration Guidelines for DiffServ Service Classes," Aug. 2006, 57 pages, Network Working Group, Request for Comments: 4594, The Internet Society.
Andersson, et al., "LDP Specification," Oct. 2007, 135 pages, Network Working Group, Request for Comments: 5036, The IETF Trust.
Coltun, et al., "OSPF for IPv6," Network Working Group, Request for Comments: 5340, Jul. 2008, 94 pages.
Eggert, et al., "Unicast UDP Usage Guidelines for Application Designers," Nov. 2008, 27 pages, Network Working Group, Request for Comments: 5405, IETF Trust and the persons identified as the document authors.
Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.
Filsfils, et al., "Loop-Free Alternate (LFA) Applicability in Service Provider (SP) Networks," Jun. 2012, 35 pages, Internet Engineering Task Force (IETF), Request for Comments: 6571, IETF Trust and the persons identified as the document authors.

\* cited by examiner

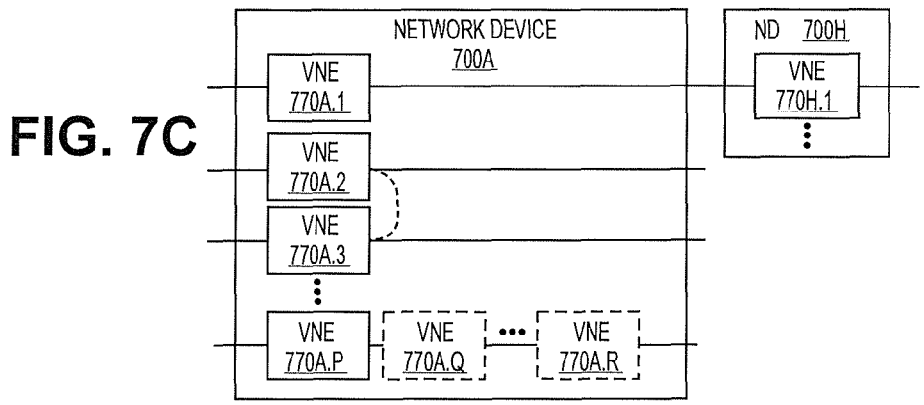
FIG. 7C
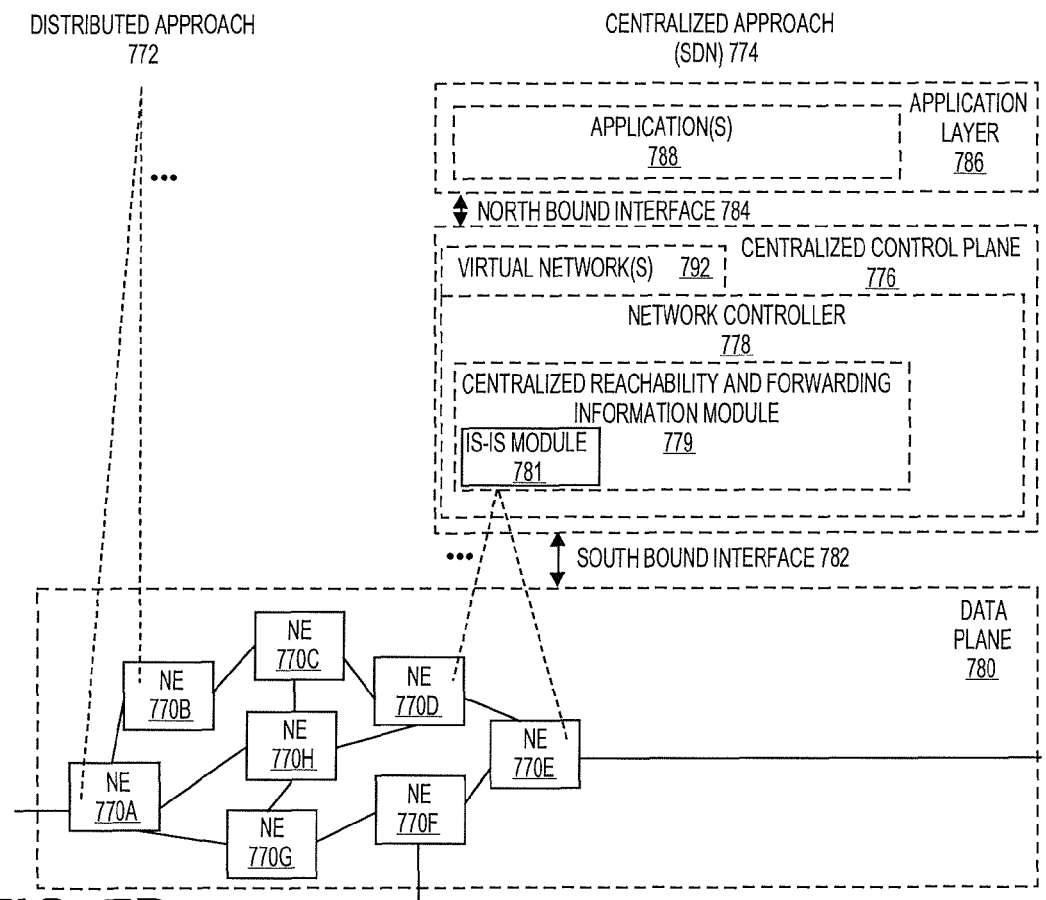
FIG. 7D
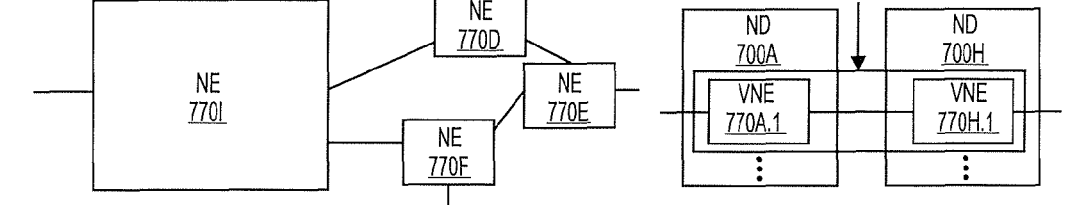
FIG. 7E
FIG. 7F

US 9,479,424 B2

OPTIMIZED APPROACH TO IS-IS LFA COMPUTATION WITH PARALLEL LINKS

FIELD

Embodiments of the invention relate to the field of intermediate system to intermediate system (IS-IS) routing protocol. More specifically, the embodiments are related to the identification of loop free alternative paths for network topologies with parallel links in an IS-IS area or domain in a computationally efficient process.

BACKGROUND

RFC 1195 [IS-IS for IP Networks] is an interior gateway protocol utilized to determine the topology and routing within a network with the network divided between level 1 areas and a level 2 domain connecting the level 1 areas. IS-IS works in conjunction with a link state protocol that advertises the adjacencies of each of the nodes in an area or domain of an IS-IS network. The IS-IS protocol utilizes a route computation algorithm such as shortest path first (SPF) algorithm to calculate routes from each network device in an IS-IS area or domain to each other network device in that area or domain as well as routes (for level 1 routers) to the border routers that enable data to be forward to destinations outside of the IS-IS network area. Each network device in the IS-IS area or domain constructs a routing information base in which the next hop to each other destination network device in the IS-IS area or domain is recorded to be utilized to forward data packets.

When an adjacent router or the link to that adjacent router designated as the next hop for a route to a given destination network device fails, traffic disruption will occur until the network re-converges (i.e., recalculates paths to each of the network devices in the IS-IS area or domain). This disruption of traffic can be prevented by Loop Free Alternatives (LFA) technology in principle as specified in RFC 5286. LFAs are alternate routes to each network device that can be utilized in the case that a next hop to a given destination is not available.

In many IS-IS network areas or domains network devices are connected with a set of adjacent routers through multiple parallel links. These links can have different characteristics including differences in bandwidth, latency and other metrics. Other metrics related to routers can include load, provisioning and similar dynamic traffic conditions. Such metrics alone or in combination can be the basis for calculating a 'cost' for each link that can be utilized in routing computations including the SPF computation.

SUMMARY

A method is described that is executed by a network device to calculate loop free alternative (LFA) for nodes in an intermediate system-intermediate system (IS-IS) area or IS-IS domain where the network device is connected with other nodes via multiple parallel links, and where shortest path first (SPF) of the primary paths for the network device tracks directly connected links from each node in the IS-IS area or IS-IS domain to the network device which is a source node for the SPF. The method includes adding the source node to a candidate list with a cost of zero, selecting a least cost candidate node from the candidate list, selecting a next link of the selected candidate node, checking whether the selected candidate node is a source node, and saving the selected link as a non-equal cost multi-path (ECMP) directly connected link for a node connected to other end of the selected link, where the selected candidate node is the source node. The method also includes checking whether the node connected to the other end of the selected link is in a permanent tree, checking whether the node at the other end of the selected link is in a candidate list, and adding the node connected to the other end of the selected link to candidate list, where the node connected to the other end of the selected link is not in the candidate list. Further, the method include checking whether a cost of the selected candidate node plus a cost of the selected link is less than the cost of the node at the other end of the selected link, updating the cost of the node at the other end of the selected link, where the cost of the selected candidate node plus the cost of the selected link is less than the cost of the node at the end of the selected link, setting the selected link as next hop of the node at the other end of the selected link, where the selected candidate node is the source node, inheriting a selected candidate next hop to the node at the other end of the selected link, and moving the selected candidate node to the permanent tree.

A network device calculates the loop free alternative (LFA) for nodes in an intermediate system-intermediate system (IS-IS) area or IS-IS domain where the network device is connected with other nodes via multiple parallel links, and where shortest path first (SPF) of the primary paths for the network device tracks directly connected links from each node in the IS-IS domain or IS-IS area to the network device which is a source node for the SPF. The network device includes a data store to store a topology of the IS-IS area or IS-IS domain and a processor communicatively coupled to the data store. The processor is configured to execute an IS-IS module. The IS-IS module is configured to add the source node to a candidate list with a cost of zero, select a least cost candidate node from the candidate list, to select a next link of the selected candidate node, to check whether the selected candidate node is a source node, to save the selected link as a non-equal cost multi-path (ECMP) directly connected link for a node connected to other end of the selected link, where the selected candidate node is the source node, to check whether the node connected to the other end of the selected link is in a permanent tree, to check whether the node at the other end of the selected link is in a candidate list, to add the node connected to the other end of the selected link to candidate list, where the node connected to the other end of the selected link is not in the candidate list, to check whether a cost of the selected candidate node plus a cost of the selected link is less than the cost of the node at the other end of the selected link, to update the cost of the node at the other end of the selected link, where the cost of the selected candidate node plus the cost of the selected link is less than the cost of the node at the end of the selected link, to set the selected link as next hop of the node at the other end of the selected link, where the selected candidate node is the source node, to inherit a selected candidate next hop to the node at the other end of the selected link, and to move the selected candidate node to the permanent tree.

A non-transitory computer-readable medium has a set of instructions stored therein, which when executed by a network device to calculate the loop free alternative (LFA) for nodes in an intermediate system-intermediate system (IS-IS) area or IS-IS domain where the network device is connected with other nodes via multiple parallel links, and where shortest path first (SPF) of the primary paths for the network device tracks directly connected links from each node in the IS-IS domain to the network device which is a source node for the SPF. The medium further includes instructions, which when executed by the network device cause the network device to perform a set of operations. The operations includes adding the source node to a candidate list with a cost of zero, adding the source node to a candidate list with a cost of zero, selecting a least cost candidate node from the candidate list, selecting a next link of the selected candidate node, checking whether the selected candidate node is a source node, saving the selected link as a non-equal cost multi-path (ECMP) directly connected link for a node connected to other end of the selected link, where the selected candidate node is the source node, checking whether the node connected to the other end of the selected link is in a permanent tree, checking whether the node at the other end of the selected link is in a candidate list, adding the node connected to the other end of the selected link to candidate list, where the node connected to the other end of the selected link is not in the candidate list, checking whether a cost of the selected candidate node plus a cost of the selected link is less than the cost of the node at the other end of the selected link, updating the cost of the node at the other end of the selected link, where the cost of the selected candidate node plus the cost of the selected link is less than the cost of the node at the end of the selected link, setting the selected link as next hop of the node at the other end of the selected link, where the selected candidate node is the source node, inheriting a selected candidate next hop to the node at the other end of the selected link, and moving the selected candidate node to the permanent tree.

A control plane device is configured to implement at least one centralized control plane for a software defined network (SDN). The centralized control plane is configured to calculate loop free alternative (LFA) for nodes in an intermediate system-intermediate system (IS-IS) area or IS-IS domain where the network device is connected with other nodes via multiple parallel links, and where shortest path first (SPF) of the primary paths for the network device tracks directly connected links from each node in the IS-IS domain or IS-IS area to the network device which is a source node for the SPF. The control plan device include a storage medium to store a topology of the IS-IS area or IS-IS domain, and a processor communicatively coupled to the storage medium. The processor is configured to execute the centralized control plane software. The centralized control plane software implements an IS-IS module. The IS-IS module is configured to add the source node to a candidate list with a cost of zero, select a least cost candidate node from the candidate list, to select a next link of the selected candidate node, to check whether the selected candidate node is a source node, to save the selected link as a non-equal cost multi-path (ECMP) directly connected link for a node connected to other end of the selected link, where the selected candidate node is the source node, to check whether the node connected to the other end of the selected link is in a permanent tree, to check whether the node at the other end of the selected link is in a candidate list, to add the node connected to the other end of the selected link to candidate list, where the node connected to the other end of the selected link is not in the candidate list, to check whether a cost of the selected candidate node plus a cost of the selected link is less than the cost of the node at the other end of the selected link, to update the cost of the node at the other end of the selected link, where the cost of the selected candidate node plus the cost of the selected link is less than the cost of the node at the end of the selected link, to set the selected link as next hop of the node at the other end of the selected link, where the selected candidate node is the source node, to inherit a selected candidate next hop to the node at the other end of the selected link, and to move the selected candidate node to the permanent tree.

A computing device implements a plurality of virtual machines for implementing network function virtualization (NFV). A virtual machine from the plurality of virtual machines is configured to calculate loop free alternative (LFA) for nodes in an intermediate system-intermediate system (IS-IS) area or IS-IS domain where the network device is connected with other nodes via multiple parallel links, and where shortest path first (SPF) of the primary paths for the network device tracks directly connected links from each node in the IS-IS domain or IS-IS area to the network device which is a source node for the SPF. The computing device includes a storage medium to store an IS-IS module and a topology of the IS-IS area or IS-IS domain, and a processor communicatively coupled to the storage medium. The processor configured to execute the virtual machine. The virtual machine is configured to execute an IS-IS module. The IS-IS module is configured to add the source node to a candidate list with a cost of zero, select a least cost candidate node from the candidate list, to select a next link of the selected candidate node, to check whether the selected candidate node is a source node, to save the selected link as a non-equal cost multi-path (ECMP) directly connected link for a node connected to other end of the selected link, where the selected candidate node is the source node, to check whether the node connected to the other end of the selected link is in a permanent tree, to check whether the node at the other end of the selected link is in a candidate list, to add the node connected to the other end of the selected link to candidate list, where the node connected to the other end of the selected link is not in the candidate list, to check whether a cost of the selected candidate node plus a cost of the selected link is less than the cost of the node at the other end of the selected link, to update the cost of the node at the other end of the selected link, where the cost of the selected candidate node plus the cost of the selected link is less than the cost of the node at the end of the selected link, to set the selected link as next hop of the node at the other end of the selected link, where the selected candidate node is the source node, to inherit a selected candidate next hop to the node at the other end of the selected link, and to move the selected candidate node to the permanent tree.

BRIEF DESCRIPTION OF THE DRAWINGS

The invention may best be understood by referring to the following description and accompanying drawings that are used to illustrate embodiments of the invention. In the drawings:

FIG. 7C illustrates various exemplary ways in which virtual network elements (VNEs) may be coupled according to some embodiments of the invention.

FIG. 7D illustrates a network with a single network element (NE) on each of the NDs of FIG. 7A, and within this straight forward approach contrasts a traditional distributed approach (commonly used by traditional routers) with a centralized approach for maintaining reachability and forwarding information (also called network control), according to some embodiments of the invention.

FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments of the invention.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention.

DESCRIPTION OF EMBODIMENTS

Figure 1:
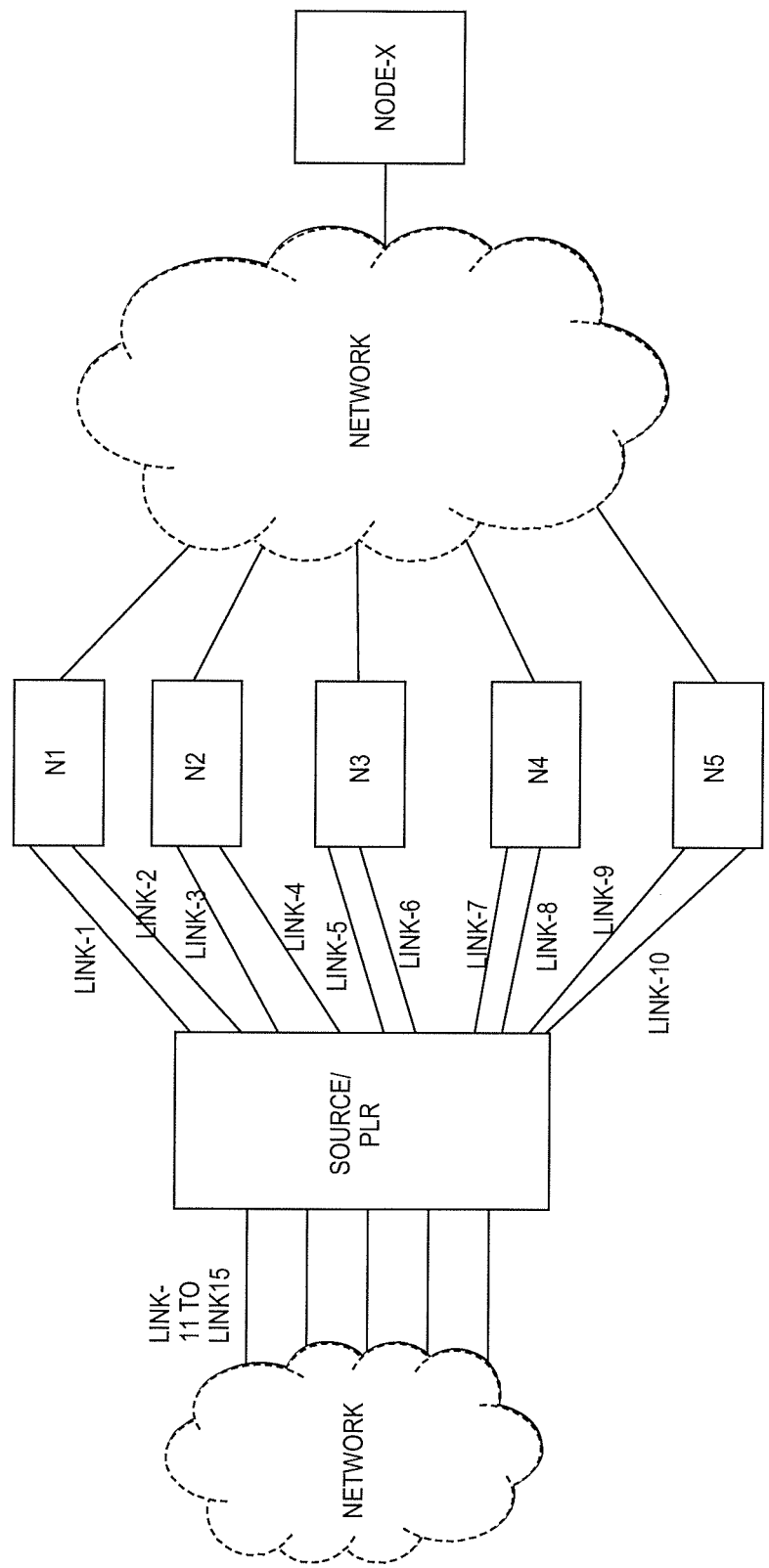
FIG. 1 is a diagram of one embodiment of an example network topology of an intermediate system to intermediate system (IS-IS) area or domain.

The following description describes methods and apparatus for optimized determination of loop free alternatives for network topologies with parallel links in an IS-IS network area or domain. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Overview

In IS-IS networks a valid neighbor of any given node in the network is represented through an established adjacency between the node and its neighbor. IS-IS is often utilized in (but not limited to) the networks of Service Providers (SP). In SP networks there are often parallel links between head end routers and their neighbors for various reasons including to meet bandwidth requirements, equal cost multi-path purposes, or non-equal cost links for fast re-route purposes. In all these cases, if loop free alternatives (LFAs) need to be calculated, it is necessary to consider each valid adjacency through each neighbor router and to determine if each link to the neighbor can provide a loop free alternative to any destination nodes in the network.

As SP networks for IS-IS can be quite large, (e.g., over 1000 nodes with 10's of thousands of prefixes because of links, loopbacks or external, leaked routes) it is necessary to be prudent in computing LFAs from each valid adjacency neighbor for the root of the shortest path tree (SPT) that is utilized in the shortest path first (SPF) primary path computation and the LFA computation.

In the case of parallel links from a point of local repair (PLR), which is a source node in the IS-IS topology that is utilized as a root of a shortest path tree in the shortest path computation to calculate paths to neighbor nodes with different costs and valid adjacencies, it is not necessary to compute the SPT from each adjacency. This will incur unnecessary computation cost to expand the whole network from the neighbor multiple times. However, this is the current process that is utilized for calculating LFA in topologies with parallel links. This is a significant disadvantage of current LFA computation techniques.

The embodiments of the invention overcome these disadvantages of the prior art by utilizing an alternative approach to the primary SPF computation and subsequent LFA computations using SPF (LFA SPF computations) as is described herein below to reduce the number of LFA SPF computations required in cases of parallel adjacencies between the source ode/PLR and the neighboring nodes. This includes taking care of all equal cost multi-path (ECMP) and non-ECMP parallel links to the neighbor in the primary SPF computation and storing them in a neighbor data structure. With the embodiments of the invention described herein below, one LFA SPF computation from each neighboring node point of view is all that is required to consider all valid parallel adjacencies in computing LFAs for an IS-IS area or domain.

The embodiments described herein describe the use of the alternate SPF and LFA computations with relation to example topologies and with relation to service provider networks. However, one skilled in the art would understand that these processes and computations can be applied to any IS-IS network with parallel links between nodes in the network. The network can be any network utilizing IS-IS and is not limited to SP networks which are discussed by way of example and not limitation.

The processes for SPF and LFA computation for an IS-IS area or IS-IS domain with parallel link that are described herein below can be applied for Internet Protocol version 4 (IPv4) and/or Internet Protocol version 6 (IPv6) routes and topologies. The process can be applied to each (IPv4 and IPv6) in any order or in parallel. The processes for handling each (IPv4 and IPv6) are similar and for sake of clarity are not separately addressed.

FIG. 1 is a diagram of one embodiment of an example network topology of an IS-IS area or domain. In the example network topology, a source node from which the SPF and LFA calculations are to be computed as part of the overall IS-IS convergence process for this network. The network topology is provided by way of example, however the processes described herein can be utilized in any topology with parallel links.

In the example network, the source node or point of local repair (PLR) has 15 links in total and five neighboring routers (N1 to N5). Each of the neighboring routers has two parallel links with the source node/PLR and each link is labeled from Link-1 to Link-10. Some of the parallel links are equal cost to neighboring router 'Nx' and some have higher costs. Link-11-Link15 are connected to other neighbors in the network (e.g., N6-N10, not shown in the diagram). All links have corresponding adjacencies with the source node/PLR. In other words, each link is treated as a basis for a separate and independent link to an adjacent node such that the source node/PLR is considered to have 15 adjacencies corresponding to each link. In this example, if a network operator intends to protect all the possible link and corresponding node failures from the perspective of the source node/PLR then the network operator would either have to do 15 (i.e., total number of adjacencies, one per link) LFA SPF computations rooted at the neighbor node represented by the adjacency or it would have to do 10 LFA SPF computations, one for each of the neighboring nodes (N1 to N10) and with each LFA SPF computation the source node/PLR has to identify all the corresponding links to the neighbor in question by looking into all the global interfaces the source node/PLR might have.

Depending on the network size both approaches described above are not cost effective, where the link based approach is more computationally expensive compared to the node based approach. The embodiments described herein below provide an alternate process that is a simplified and cost effective approach to LFA computation for the illustrated example where only 10 LFA computations rooted at each neighbor would occur and where these computations would be possible without having to identify all the links associated with each neighbor node every time that neighbor node is picked to be the root of the shortest path tree to perform the LFA SPF computation. As noted above, the illustrated network topology is provided by way of example, however the advantages of the embodiments described herein below would apply to any IS-IS network topology with parallel links.

In particular, the LFA computation is done by keeping the handling of each neighbor node as represented in the adjacency as a root and by following RFC 5286 inequalities to determine if this adjacency can be a potential alternative to any of the nodes or prefixes in the network. However, if parallel adjacencies are present for the same neighbor node from the source node/PLR, it is unnecessary to expand the whole network multiple times from the same neighbor node. Because none of the parallel adjacencies from source node/PLR to neighbor node play any role in determining if the neighbor provides link, node or link-and-node protection to a destination in the network.

If a particular neighbor node does not provide link, node or link-and-node protection to a destination in the network then it is unnecessary and inefficient to look into any of the links to that neighbor node. For example, assuming a neighbor does provide link, node or link-and-node protection to some destination X in the network, then any parallel link to a neighbor node will be preferred over another link for that neighbor node if and only if it provides better protection with respect to equal cost multi-path (ECMP), shared risk link group (SRLG) or similar technologies. To check this, it is not necessary to run an LFA SPF computation from the neighbor multiple times. All directly connected parallel links to a neighbor node fall under one of the following groups: group-1 shortest path link to a neighbor or group-2 higher cost link to a neighbor node. All the links in-group 1 will anyways be identified and stored during the primary SPF computation. The challenge is to identify the links in-group 2. To avoid this challenge it is possible to run LFA SPF computations from each neighbor node for each of the links in Group-1 and Group-2. This process is what is utilized in most of the current solutions. That is if there are 10 parallel links to a neighbor node, the LFA SPF computation will be run 10 times from that neighbor node.

The embodiments described herein below describe how this can be avoided and instead one LFA SPF computation can be run from each neighbor node and the links can be separately considered without having to search for all the links corresponding to a neighbor node and for every neighbor node and without multiple SPFs having to be represented in each parallel link of the valid adjacency. To get all the links in group-2 for a neighbor node, the source node/PLR has to traverse all of its interfaces or adjacencies. This can be a huge performance impacting issue when there are a substantial number of adjacencies from the source node/PLR, but for only a few of those "LFA backup" is enabled (i.e., the link is eligible to be considered as a backup).

In the embodiments described herein below, the process will identify all parallel links to a neighbor node without walking through all the adjacencies or interfaces from the source node/PLR. Thus, the process will avoid extra LFA computations per adjacency and/or the extra cost of looking though all the interfaces corresponding to each neighboring router from the global interface database.

Figure 2:
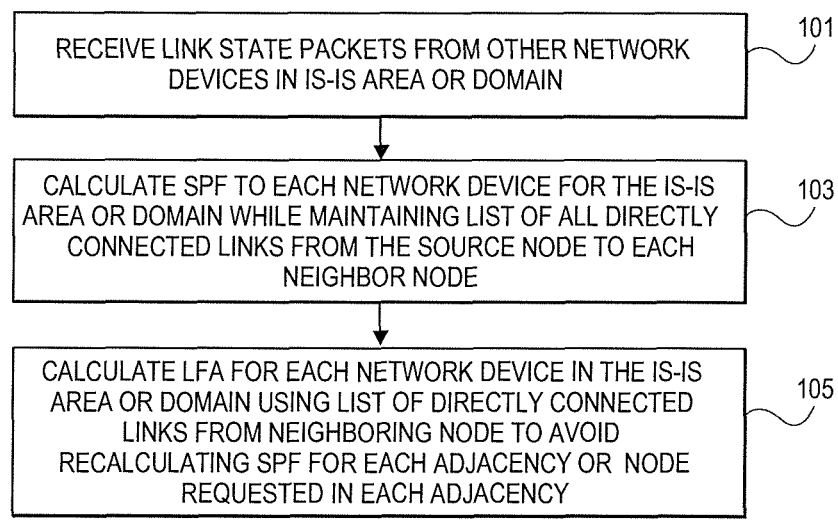
FIG. 2 is a flowchart of one embodiment of an IS-IS convergence process including shortest path first (SPF) and loop free alternative (LFA) computation processes for improved computational efficiency for parallel links.

FIG. 2 is a flowchart of one embodiment of an IS-IS convergence process including SPF and LFA computation processes for improved computational efficiency for parallel links. In one embodiment, the convergence process begins with the determination of adjacencies with neighboring nodes using the IS-IS protocol to build an adjacency database. The process continues with the exchange and receiving of link state packets according to the link state protocol (LSP) from each network device in the IS-IS area or IS-IS domain as described in RFC 1195 (Block 101) thereby synchronizing the link state protocol database between the network devices in the IS-IS area or IS-IS domain.

This link state data is utilized to construct a topology of the IS-IS area or IS-IS domain in the local link state protocol database. Using this data, each of the network devices in the IS-IS area or IS-IS domain can determine routing to each of the other network devices in the IS-IS area or IS-IS domain using a route computation algorithm such as the shortest path first (SPF) algorithm or similar routing algorithm (Block 103). A next hop for reaching each of the destination network devices in the IS-IS area or IS-IS domain is recorded in the local routing information base (RIB) to be utilized to forward packets to a given destination. During the SPF computation a list of all directly connected (equal cost multi-path (ECMP) or higher cost) links from the source node to each neighbor node can be maintained in a neighbor data structure.

The process then continues after all of the primary paths to the other network devices in the IS-IS area or IS-IS domain have been computed by computing loop free alternative paths (LFA) to each of the network devices in the IS-IS area or IS-IS domain (Block 105). The LFA can be calculated using the process defined in RFC 5286. The LFA next hops for each destination node can then be recorded in the local RIB to be utilized in the case of a link or node failure associated with the next hop of the primary path to a given destination. The LFA computation can utilize the neighbor data structure with the list of directly connected links from neighboring nodes to avoid recalculating SPF for each adjacency or node represented by each adjacency.

Figure 3A:
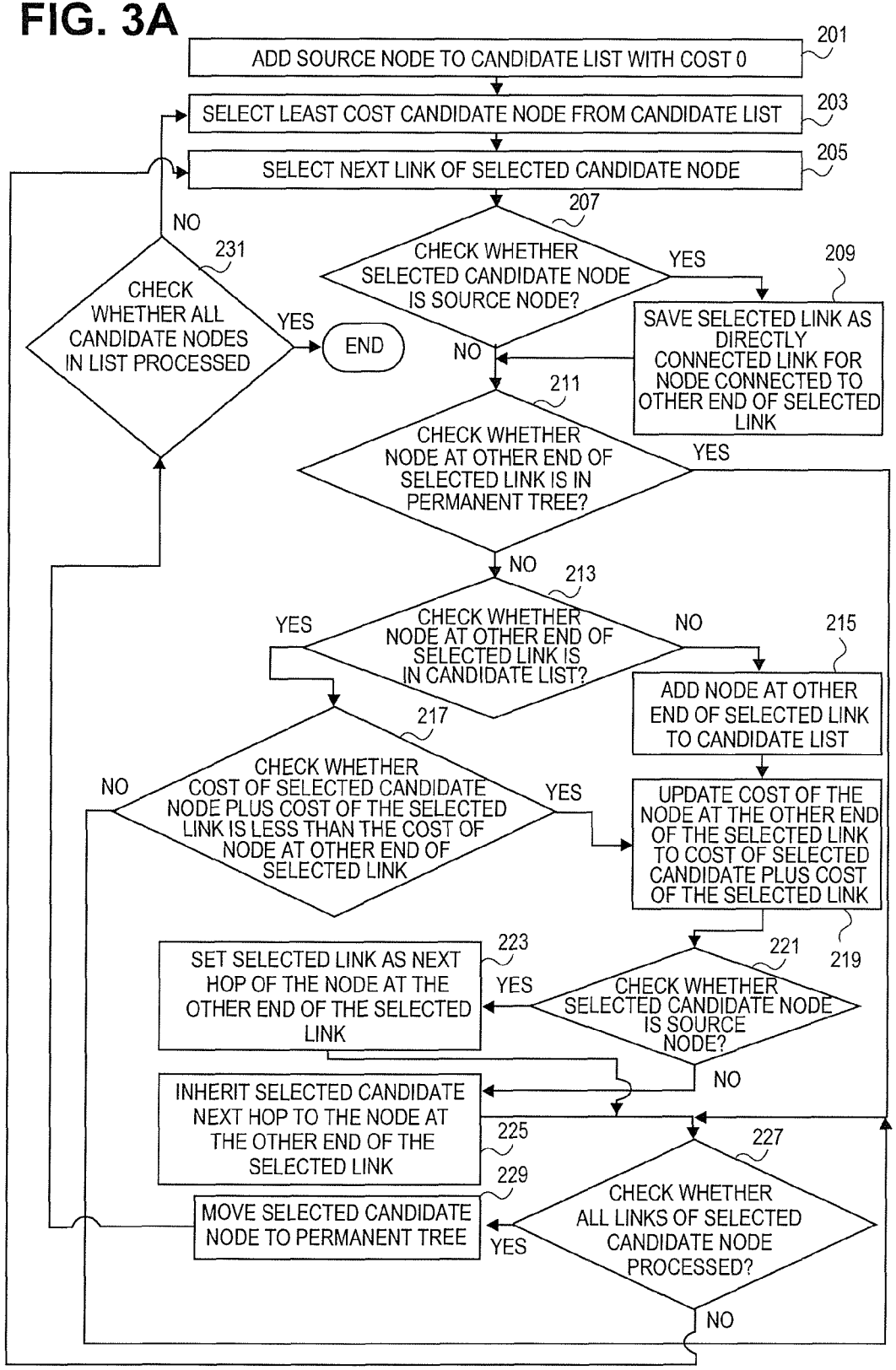
FIG. 3A is a flowchart of one embodiment of a process for identifying equal cost multi-path and non-equal cost multi-path directly connected links for a neighboring node from a source node as part of a shortest path first computation.

FIG. 3A is a flowchart of one embodiment of a process for identifying equal cost multi-path and non-equal cost multi-path directly connected links for a source node as part of the SPF computation. In one embodiment, the process begins with a candidate list for nodes in the network topology to be processed as part of a shortest path first computation where each node in the candidate list is associated with a cost for reaching the source node. Initially, the candidate list is empty and candidate nodes are added. The source node is added to the candidate list with an associated cost of reaching the source node as zero (Block 201). The process then selects a least cost candidate node from the candidate list (Block 203). A next link of the selected candidate node is then chosen to be processed (Block 205). The links can be processed in any order. A check is then made whether the selected candidate node is the source node (Block 207). If the selected candidate node is the source node, then the process saves the selected link as a directly connected link for the node that is connected to the other end of the currently selected link (Block 209). This link is saved to the neighbor data structure. After saving or if the selected candidate is not the source node, then a check is made whether the node at the other end of the selected link is in the permanent tree (Block 211). The permanent tree is the shortest path tree that is constructed by the SPF computation as a representation of the topology of the network. If the node at the other end of the selected link is in the permanent tree, then the process proceeds to have the node at the other end of the selected link inherent the next hop of the selected candidate node (Block 225). The process then checks if additional links remain to be processed (Block 227) and whether additional candidate nodes remain to be processed (Block 231) in which case these further links or candidate nodes are processed.

If the node at the other end of the selected link is not in the permanent tree, then a check is made whether the node at the other end of the link is in the candidate list (Block 213). If the node at the other end of the selected link is not in the candidate list, then this node at the other end of the selected link is added to the candidate list (Block 215), the cost of the node at the other end of the selected link is updated to the cost of the selected candidate plus cost of the selected link (Block 219), and a check is made again whether the selected candidate node is the source node (Block 221). If the selected candidate node is the source node, then the selected link is set as the next hop of the node at the other end of the selected link (Block 223). If the selected candidate node is not the source node, then the process checks if additional links remain to be processed (Block 227) and whether additional candidate nodes remain to be processed (Block 231) in which case these further links or candidate nodes are processed.

If the check at Block 213 indicates that the node at the other end of the selected link is in the candidate list, then a check is made whether a cost of the selected candidate node plus the cost of the selected link is less than the cost of the node at the other end of the selected link (Block 217). If the cost is less, then the cost of the node at the other end of the selected link is updated to the cost of the selected candidate plus cost of the selected link (Block 219), and a check is made again whether the selected candidate node is the source node (Block 221). If the selected candidate node is the source node, then the selected link is set as the next hop of the node at the other end of the selected link (Block 223). If the selected candidate node is not the source node, then the next hop of the selected candidate node is inherited by the node at the other end of the selected link (Block 225). Subsequently, the process then checks if additional links remain to be processed (Block 227) and whether additional candidate nodes remain to be processed (Block 231) in which case these further links or candidate nodes are processed.

If at Block 217, the cost is not less, then the process then checks if additional links remain to be processed (Block 227) and whether additional candidate nodes remain to be processed (Block 231) in which case these further links or candidate nodes are processed. In all cases, where all of the links of a selected candidate node have been processed (Block 227), the selected candidate node is moved to the permanent tree (Block 229). Once all candidate nodes and their links have been processed then the process completes after the check at Block 231.

Figure 3B:
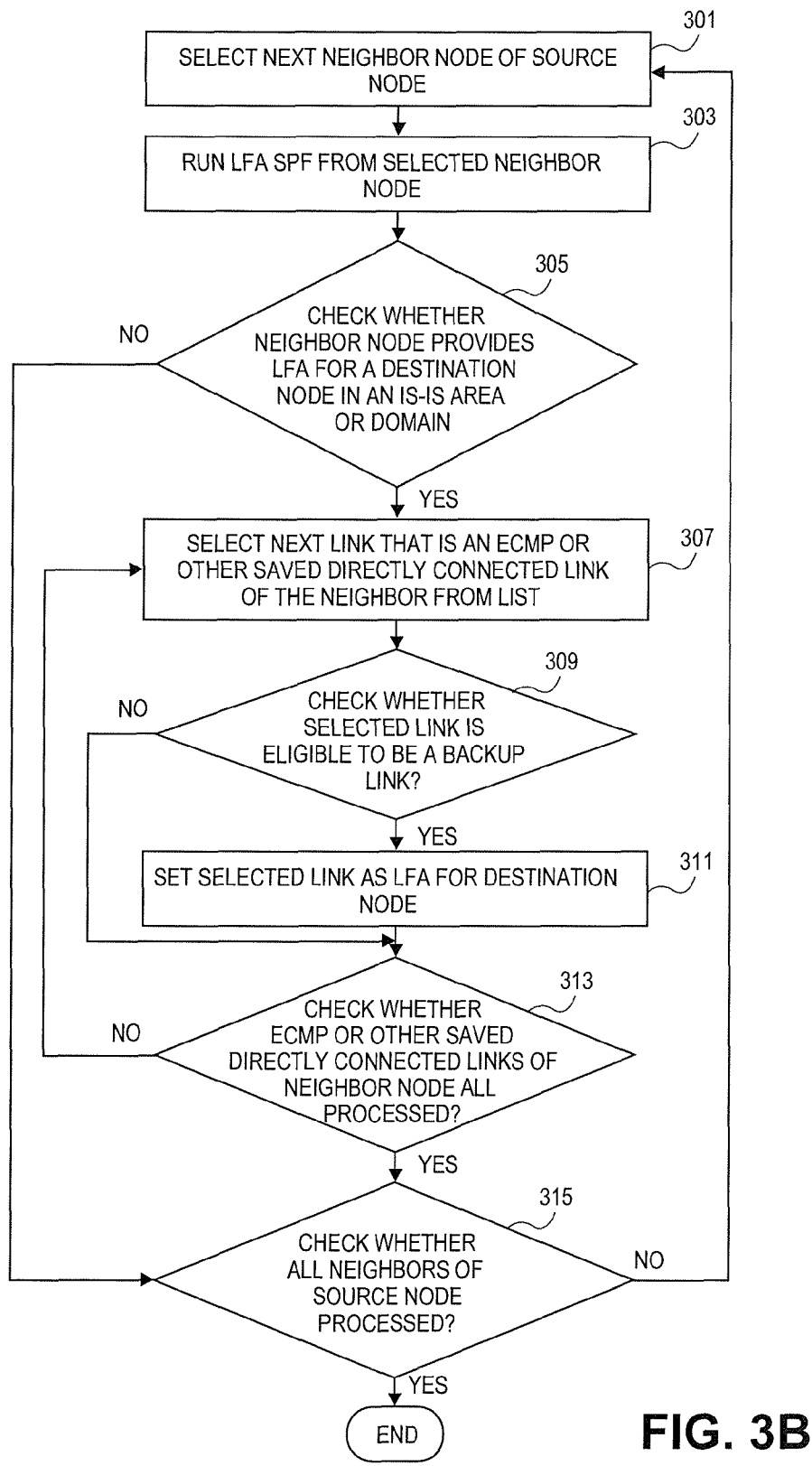
FIG. 3B is flowchart of one embodiment of a process for an optimized LFA computation.

FIG. 3B is flowchart of one embodiment of a process for LFA computation making use of the neighbor data structure. In one embodiment, the process selects a next neighbor node of the source node to be processed (Block 301). The LFA SPF is then run from the selected neighbor node (Block 303). Backup eligibility can be administratively determined or based on any other eligibility criteria. A check is made whether neighbor node provides a LFA for a destination node in an IS-IS area or domain (Block 305). If no LFA is provided, then the process checks whether all neighbors of the source node have been processed (Block 315). If all neighbors have been processed, then the process completes. If all of the neighbors have not been processed, then a next neighbor node of the source node is selected (Block 301).

If the neighbor node does provide an LFA for a destination node in an IS-IS area or domain, then the process selects the next link that is an ECMP or other saved directly connected link of the neighbor from the list in the neighbor data structure (Block 307). A check is then made whether the selected link is eligible to be a backup link (Block 309). If the selected link is eligible, then the selected link is set as the LFA for the destination node (Block 311). After the selected link is set or if the link is not eligible, then a check is made whether all ECMP or other saved directly connected links of the neighbor node are processed (Block 313). If all of the links have not been processed, then the next link is selected for neighbor (Block 307). If all of the links have been processed, then a check is made whether all of the neighbor nodes for the source node have been processed (Block 315). If all of the neighbors have not been processed, then the next neighbor is selected (Block 301). If all of the neighbors have been processed, then the process is complete.

Figure 4:
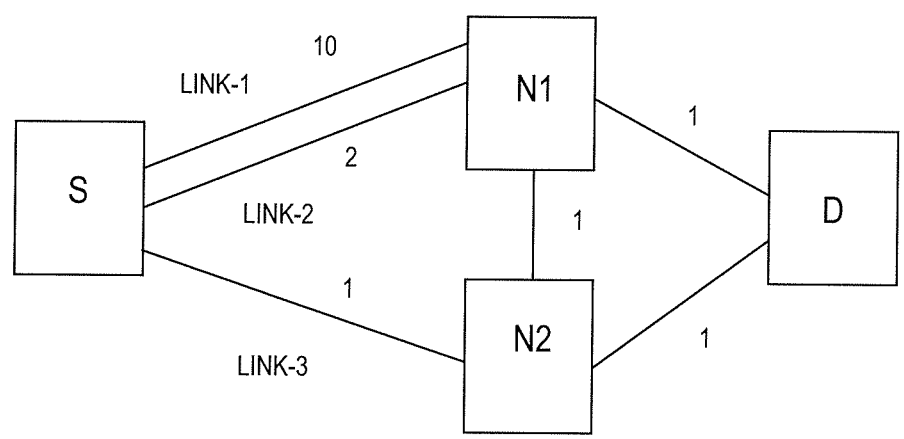
FIG. 4 is a diagram of an example network topology in which LFAs are calculated for parallel links.

FIG. 4 is a diagram of an example network topology in which LFAs are calculated for parallel links. An example of the application of the process is described herein with relation to the example network topology of FIG. 4. From the source node S (PLR) there are 2 neighboring nodes N1 and N2. Neighbor N1 has parallel links to the PLR with different costs and on both links there are established adjacencies. If each valid adjacency of the N1 is considered for LFA, then two LFA SPF computations rooted at the same neighbor N1 would previously be needed as represented in respective adjacencies to N1 from node S. But with the proposed method only one LFA SPF computed rooted at N1 is required to consider all parallel links towards the neighbor nodes. To achieve this during primary SPF computation rooted at source node S, all links with valid adjacencies (during expansion after back link check) are stored from the potential LFA neighbor N1.

In other words, when the primary SPF computation is started at a root source node S, as a first step every neighbor of node S will be added to the candidate list by considering each of the links at S that has an adjacency. If the primary SPF encounters a node that is already in the candidate list (in case of parallel-links) the node is not added again. Instead, just the cost of the node is updated to the lowest cost. In addition, the process updates the next hop and cost of the node, but also keeps the list of all the directly connected links from node S to the node. However, this is done only for immediate neighboring nodes of node S and not for all the nodes in the network.

In further detail, when the primary SPF computation is run from node S the process is described in order below. The primary SPF computation shown here is done, as per ISO 10589 Appendix F and this is elaborated here to explain what and how exactly the required parallel links information is stored.

First the process from the perspective of node S adds node S as the source node into the candidate list with cost 0. Second, the process reviews link-1 and adds N1 into the candidate list with cost 10 with next hop as link-1 and also saves link and cost as directly connected link to N1. Third, the process examines link-2 and tries to add N1 again into the candidate list but finds that N1 is already in the candidate list. Hence, the process updates the cost of N1 to 2 and next hop to link-2 also saves this link and cost as directly connected link to N1. Fourth, node S looks at link-3 and adds N2 into the candidate list with cost 1 and next hop as link-3 and also saves this link and cost as directly connected link to N2. Fifth, the process has put all immediate neighbors of node S in the candidate list, S will be moved to permanent tree. Sixth, the process will pick shortest node in the candidate list, which is N2, and investigates all the links of N2. Seventh, the process picks link N2-S and finds that S is already in the permanent tree and hence it is ignored. Eighth, the process picks link N2-N1 and tries to add N1 in the candidate list. Since N1 is already in the candidate list with equal cost of 2, an ECMP has been encountered. Hence, N1 is updated in the candidate list with an ECMP next hop of link-3 and cost 2. But note that this is not saved as directly connected link to N1 because N2 is NOT a source node. Ninth, the process picks link N2-D and adds D into the candidate list with cost 2 and next hop link-3. Tenth, N2 is moved from the candidate list to the permanent tree. Eleventh, the process picks the next shortest node in the candidate list, which is N1 and investigates all of the links of N1. Twelfth, the process picks links link-1 and link-2 and sees that node S is already in the permanent tree hence these links are ignored. Thirteenth, the process link N1-N2 and sees that N2 is already in the permanent tree hence the link is ignored. Fourteenth, the process picks link N1-D and tries to add D into the candidate list with ECMP next hop link-2 and link-3 with cost 3, but sees that its already present in the candidate list with cost 2. Hence nothing is done. Note here again that here the process does not save the link and costs because N1 is NOT a source node. Fifteenth, N1 is moved to the permanent list. Sixteenth, the only remaining node D in the candidate list is picked and all the links of D will be investigated. Seventeenth, as N1 and N2 both are in the permanent tree, both of the links of D are ignored and D is moved to the permanent tree.

After this SPF computation has completed, then the LFA SPF computations can be performed from other nodes (e.g., N1) while avoiding unnecessary duplicative calculations. During the LFA SPF from N1, as per RFC 5286 the following information is utilized, first a distance from N1 to any destination node D, second a shortest distance from N1 to S, third a shortest distance from S to any destination node D, and for the a shortest distance from N to primary next hop node of any destination D, i.e., a shortest distance from N1 to E. To get all the above four distances, or any distances mentioned in RFC 5286, it is not required to consider all the parallel links to a neighbor separately.

Once it is known that N1 can be an LFA for destination D, then it is possible to look at all the directly connected links to N1 to choose the better one in terms of SRLG, backup eligibility, and ECMP configurations, as may be required by the administrator. With respect to the illustrated example, below is what will be obtained at N1 after the primary SPF.

ECMP Nexthop:

| Nexthop | Link Cost |
|---|---|
| Link-2 | 2 |
| Link-3 | 2 |

Other Saved Nexthops Nexthop:

| Nexthop | Link Cost |
|---|---|
| Link-1 | 10 |
| Link-2 | 2 |

After LFA SPF is run from the perspective of N1, it is found N1 can be an LFA for D. Note that Link-3 is not directly connected to N1 hence this link will not be considered as an LFA next hop. Only Link-2 and Link-1 will be considered. The process can also determine which path for S→N1→D to use. Any one of these two (i.e., Link-2 and Link-1) links can be utilized. In this case the process examines those links instead of running LFA SPF from N1 two times for each of the links. Hence, in this simple topology the process saves one LFA SPF computation. Thus, the advantage of the invention is shown that the number of SPF computations would be reduced to number of adjacent nodes for the source/PLR instead of the number of links (valid adjacencies) of the source/PLR.

As mentioned herein above, the processes described herein are applicable to both IPv4 and IPv6 network topologies. The parallel links of each eligible IPv4 or IPv6 adjacent node can be saved to be utilized in subsequent computations such as for the corresponding topology LFA computations. In some embodiments, the processes can be applied to other computations such as the 'q' space computations as represented in 'Remote LFA FRR' (http://tools.ietf.org/html/draft-ietf-rtgwg-remote-lfa-04).

Figure 5:
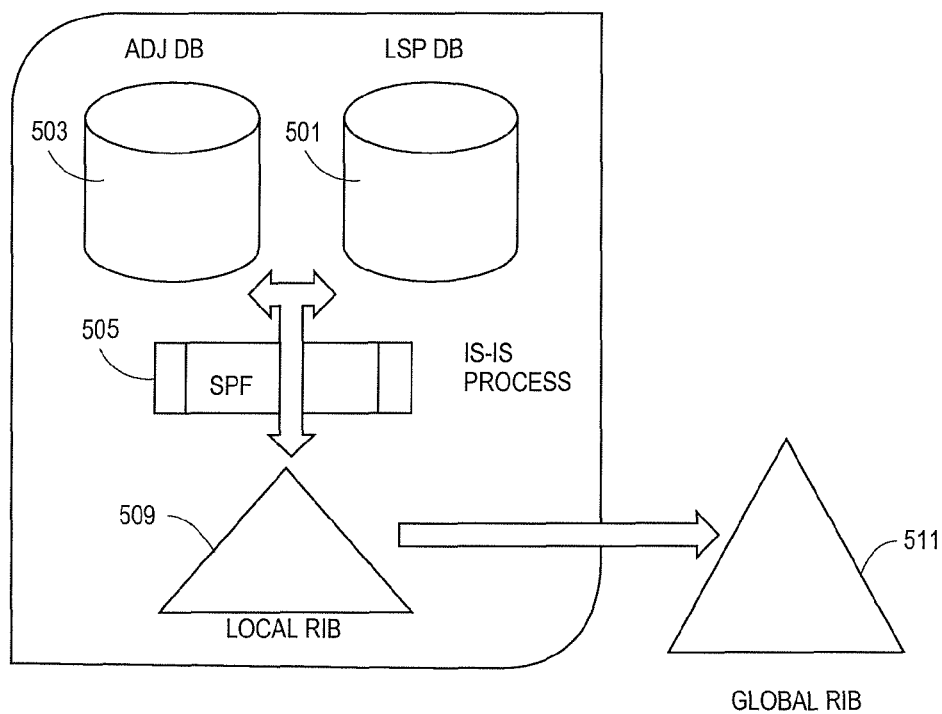
FIG. 5 is a diagram of the basic components of the IS-IS process.

FIG. 5 is a diagram of the basic components of the IS-IS process. The components of the network device that are utilized in the IS-IS process include an adjacency (ADJ) database 503, a link state protocol (LSP) database 501, a shortest path first (SPF) 505 or similar routing process, and a local RIB 509. The adjacency database 503 tracks adjacency information received from neighboring nodes connected through the physical ports and links of the network device. The link state protocol database 501 tracks the topology of the IS-IS area or IS-IS domain in which the network device is situated, which is based on exchange of link state packets. A shortest path first 505 or similar route computation algorithm processes the link state protocol database 501 to determine forwarding information that is stored in the local routing information base 509. In some embodiments, the local routing information base is synchronized or downloaded to a global routing information base 511 that is shared by all components of the network device such as line cards and similar components or that may be shared with other network devices in the IS-IS area or IS-IS domain.

Figure 6:
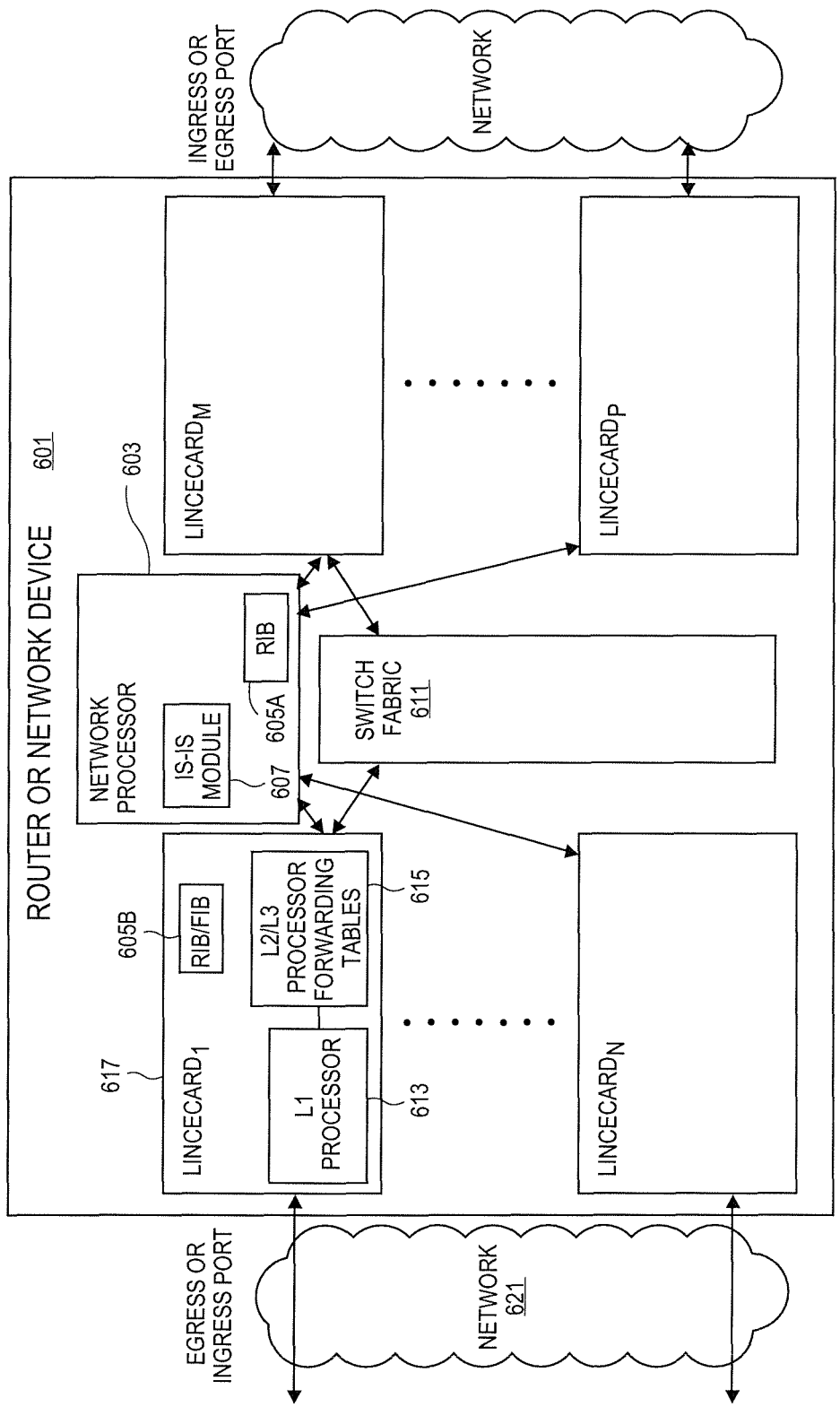
FIG. 6 is a diagram of one embodiment of a network device implementing the SPF and LFA computation processes for an IS-IS area or domain.

FIG. 6 is a diagram of one embodiment of a network device implementing the LFA computation process described herein above in an IS-IS area or IS-IS domain.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the process is implemented by a router 601 or network device or similar computing device. The router 601 can have any structure that enables it to receive data traffic and forward it toward its destination. The router 601 can include a network processor 603 or set of network processors that execute the functions of the router 601. A 'set,' as used herein, is any positive whole number of items including one item. The router 601 or network element can execute IS-IS process functionality via a network processor 503 or other components of the router 601.

The IS-IS process functions can be implemented as modules in any combination of software, including firmware, and hardware within the router. The functions of the IS-IS process that are executed and implemented by the router 601 include those described further herein above.

In one embodiment, the router 601 can include a set of line cards 617 that process and forward the incoming data traffic toward the respective destination nodes by identifying the destination and forwarding the data traffic to the appropriate line card 617 having an egress port that leads to or toward the destination via a next hop. These line cards 617 can also implement the routing information base or forwarding information base 605B, or a relevant subset thereof. The line cards 617 can also implement or facilitate the IS-IS process functions described herein above. The line cards 617 are in communication with one another via a switch fabric 611 and communicate with other nodes over attached networks 621 using Ethernet, fiber optic or similar communication links and media.

In other embodiments, the processes can be implemented by a split-architecture node, where the control plane is remote from the data/forwarding plane. In this case, the IS-IS can be carried out at any combination of the data plane nodes and the central controller.

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different than those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the router may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

Figures 7A, 7B:
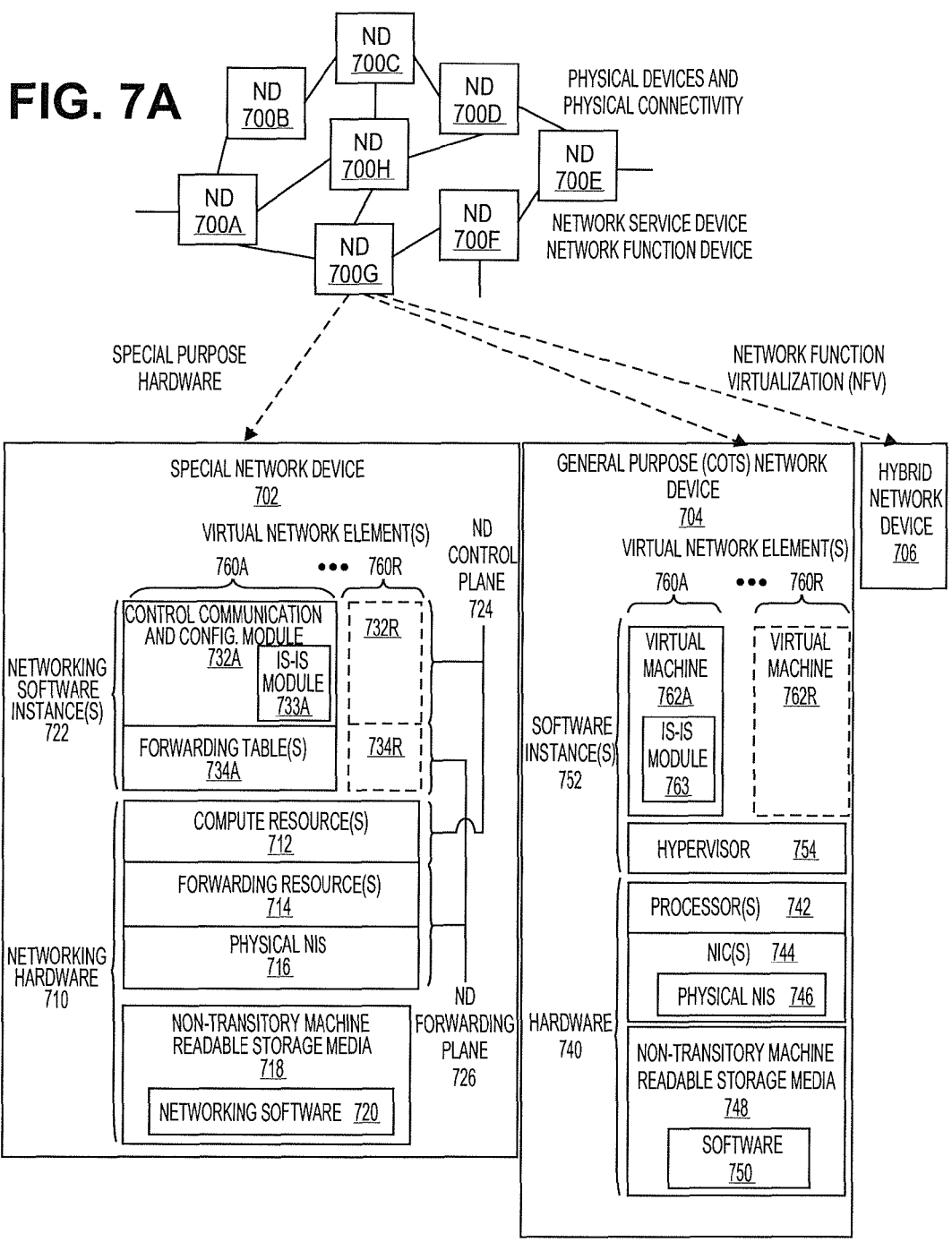
FIG. 7A illustrates connectivity between network devices (NDs) within an exemplary network, as well as three exemplary implementations of the NDs, according to some embodiments of the invention.
FIG. 7B illustrates an exemplary way to implement the special-purpose network device 702 according to some embodiments of the invention.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 700A, E, and F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a proprietary operating system (OS); and 2) a general purpose network device 704 that uses common off-the-shelf (COTS) processors and a standard OS.

The special-purpose network device 702 includes networking hardware 710 comprising compute resource(s) 712 (which typically include a set of one or more processors), forwarding resource(s) 714 (which typically include one or more ASICs and/or network processors), and physical network interfaces (NIs) 716 (sometimes called physical ports), as well as non-transitory machine readable storage media 718 having stored therein networking software 720. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 700A-H. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A). The IS-IS module 733A implements the processes described herein above as part of the Control communication and Configuration Module 732A or similar aspect of the networking software, which may be loaded and stored in the non-transitory machine readable media 718A or in a similar location.

The special-purpose network device 702 is often physically and/or logically considered to include: 1) a ND control plane 724 (sometimes referred to as a control plane) comprising the compute resource(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the compute resource(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gate-ways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein software 750. During operation, the processor(s) 742 execute the software 750 to instantiate a hypervisor 754 (sometimes referred to as a virtual machine monitor (VMM)) and one or more virtual machines 762A-R that are run by the hypervisor 754, which are collectively referred to as software instance(s) 752. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 762A-R, and that part of the hardware 740 that executes that virtual machine (be it hardware dedicated to that virtual machine and/or time slices of hardware temporally shared by that virtual machine with others of the virtual machine(s) 762A-R), forms a separate virtual network element(s) 760A-R. In one embodiment, the virtual machines 732A-R may execute the described IS-IS module 763A and related software described herein above.

The virtual network element(s) 760A-R perform similar functionality to the virtual network element(s) 730A-R. For instance, the hypervisor 754 may present a virtual operating platform that appears like networking hardware 710 to virtual machine 762A, and the virtual machine 762A may be used to implement functionality similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 762A-R differently. For example, while embodiments of the invention are illustrated with each virtual machine 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 754 includes a virtual switch that provides similar forwarding services as a physical Ethernet switch. Specifically, this virtual switch forwards traffic between virtual machines and the NIC(s) 744, as well as optionally between the virtual machines 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 7C illustrates various exemplary ways in which VNEs may be coupled according to some embodiments of the invention. FIG. 7C shows VNEs 770A.1-770A.P (and optionally VNEs 780A.Q-780A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service—e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the virtual machines 762A-R may operate as servers; the same would be true for the hybrid network device 706; in the case of the special-purpose network device 702, one or more such servers could also be run on a hypervisor executed by the compute resource(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 770A-H (e.g., the compute resource(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 172 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane CA80 over the south bound interface 782 (which may use the OpenFlow protocol). Thus, the network intelligence is centralized in the centralized control plane 776 executing on electronic devices that are typically separate from the NDs. In one embodiment, the centralized reachability and forwarding information module 779 may include the IS-IS module 781 and related software as described herein above.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the compute resource(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 174 can be implemented with the general purpose network device 704 (e.g., each of the VNE 'XA60A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 7A60A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 770I in one of the virtual network(s) 792 of FIG. 7D, according to some embodiments of the invention. FIG. 7E shows that in this virtual network, the NE 770I is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
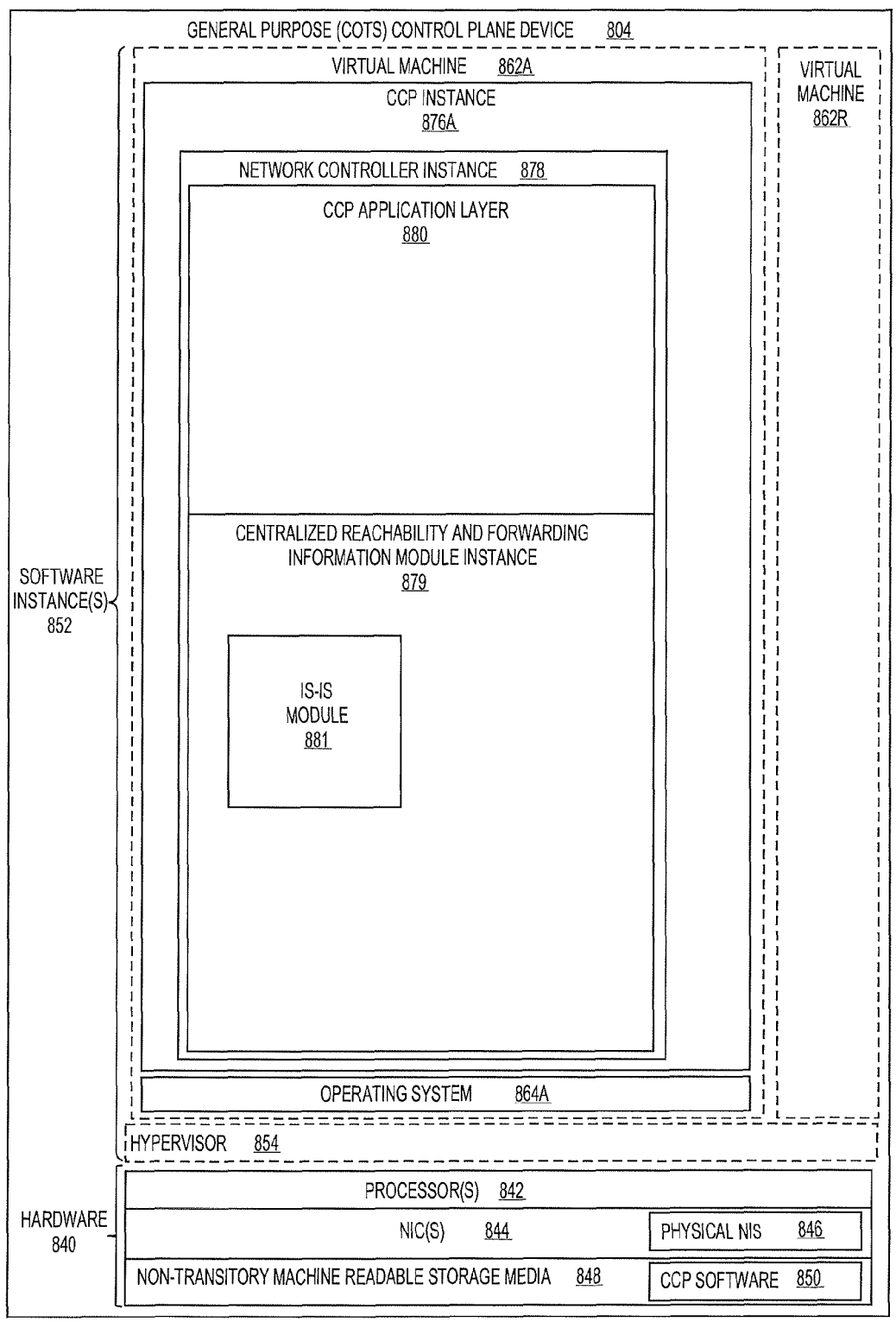
FIG. 8 illustrates a general purpose control plane device 804 including hardware 840 comprising a set of one or more processor(s) 842 (which are often Commercial off-the-shelf (COTS) processors) and network interface controller(s) 844 (NICs; also known as network interface cards) (which include physical NIs 846), as well as non-transitory machine readable storage media 848 having stored therein centralized control plane (CCP) software 850), according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein centralized control plane (CCP) software 850.

In embodiments that use compute virtualization, the processor(s) 842 typically execute software to instantiate a hypervisor 854 (sometimes referred to as a virtual machine monitor (VMM)) and one or more virtual machines 862A-R that are run by the hypervisor 854; which are collectively referred to as software instance(s) 852. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 850 (illustrated as CCP instance 876A) on top of an operating system 864A are typically executed within the virtual machine 862A. In embodiments where compute virtualization is not used, the CCP instance 876A on top of operating system 864A is executed on the "bare metal" general purpose control plane device 804.

The operating system 864A provides basic processing, input/output (I/O), and networking capabilities. In some embodiments, the CCP instance 876A includes a network controller instance 878. The network controller instance 878 includes a centralized reachability and forwarding information module instance 879 (which is a middleware layer providing the context of the network controller 778 to the operating system 864A and communicating with the various NEs), and an CCP application layer 880 (sometimes referred to as an application layer) over the middleware layer (providing the intelligence required for various network operations such as protocols, network situational awareness, and user-interfaces). In one embodiment, the centralized reachability and forwarding information module 879 may include the IS-IS module 881 and related software as described herein above.

At a more abstract level, this CCP application layer 880 within the centralized control plane 776 works with virtual network view(s) (logical view(s) of the network) and the middleware layer provides the conversion from the virtual networks to the physical view.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) (RFC 2991 and 2992) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method executed by a network device to calculate loop free alternative (LFA) for nodes in an intermediate system-intermediate system (IS-IS) area or IS-IS domain where the network device is connected with other nodes via multiple parallel links, where shortest path first (SPF) of the primary paths for the network device tracks directly connected links from each node in the IS-IS area or IS-IS domain to the network device which is a source node for the SPF, the method comprising the steps of:

adding, by the network device, the source node to a candidate list with a cost of zero;

selecting a least cost candidate node from the candidate list;

selecting a next link of the selected candidate node;

checking whether the selected candidate node is the source node;

saving the selected link in a neighbor data structure as an equal cost multi-path (ECMP) directly connected link for a node connected to other end of the selected link, where the selected candidate node is the source node;

checking whether the node connected to the other end of the selected link is in a permanent tree that is a SPF tree;

checking whether the node at the other end of the selected link is in the candidate list, where the node at the other end of selected link is not in the permanent tree;

adding the node connected to the other end of the selected link to the candidate list, where the node connected to the other end of the selected link is not in the candidate list;

checking whether a cost of the selected candidate node plus a cost of the selected link is less than a cost of the node at the other end of the selected link, where the node at the other end of the link is in the candidate list;

updating the cost of the node at the other end of the selected link to the cost of the selected candidate plus the cost of the selected link, where the cost of the selected candidate node plus the cost of the selected link is less than the cost of the node at the end of the selected link;

setting the selected link as next hop of the node at the other end of the selected link, where the selected candidate node is the source node;

inheriting a selected candidate next hop to the node at the other end of the selected link, where the selected candidate node is not the source node;

moving the selected candidate node to the permanent tree, where all links of the selected candidate node have been processed;

iterating through the above steps for each candidate node in the candidate list and each link of each candidate node; and computing at least one LFA to a destination node in the IS-IS area or IS-IS domain using the directly connected links in the neighbor data structure where the selected link in the LFA conforms to back up eligibility.

2. The method of claim 1, further comprising the steps of:
selecting a next neighbor node of the source node; and
running a LFA SPF computation from the selected neighbor node.

3. The method of claim 2, further comprising the step of:
checking whether the neighbor node provides LFA for the destination node in the IS-IS area or IS-IS domain.

4. The method of claim 3, further comprising the step of:
setting the selected link as LFA for the destination node.

5. The method of claim 2, further comprising the steps of:
selecting a further link that is an ECMP or other saved directly connected link of the neighbor node; and
checking whether the selected further link is eligible to be a backup link.

6. The method of claim 2, further comprising the step of:
adding the source node to the permanent tree; and
selecting the next neighbor node with a shortest path as a next source node.

7. The method of claim 1, wherein the IS-IS area or IS-IS domain has an internet protocol version 4 (IPv4) or IP version 6 (IPv6) topology including the network device and the connected nodes via the multiple parallel links.

8. A network device to calculate loop free alternative (LFA) for nodes in an intermediate system-intermediate system (IS-IS) area or IS-IS domain where the network device is connected with other nodes via multiple parallel links, where shortest path first (SPF) of the primary paths for the network device tracks directly connected links from each node in the IS-IS domain or IS-IS area to the network device which is a source node for the SPF, the network device comprising:
a data store to store a topology of the IS-IS area or IS-IS domain;
a processor communicatively coupled to the data store, the processor configured to execute an IS-IS module, the IS-IS module configured to add the source node to a candidate list with a cost of zero, select a least cost candidate node from the candidate list, to select a next link of the selected candidate node, to check whether the selected candidate node is the source node, to save the selected link in a neighbor data structure as an equal cost multi-path (ECMP) directly connected link for a node connected to other end of the selected link, where the selected candidate node is the source node, to check whether the node connected to the other end of the selected link is in a permanent tree that is a SPF tree, to check whether the node at the other end of the selected link is in the candidate list, where the node at the other end of selected link is not in the permanent tree, to add the node connected to the other end of the selected link to the candidate list, where the node connected to the other end of the selected link is not in the candidate list, to check whether a cost of the selected candidate node plus a cost of the selected link is less than a cost of the node at the other end of the selected link, where the node at the other end of the link is in the candidate list, to update the cost of the node at the other end of the selected link to the cost of the selected candidate plus the cost of the selected link, where the cost of the selected candidate node plus the cost of the selected link is less than the cost of the node at the end of the selected link, to set the selected link as next hop of the node at the other end of the selected link, where the selected candidate node is the source node, to inherit a selected candidate next hop to the node at the other end of the selected link, where the selected candidate node is not the source node, to move the selected candidate node to the permanent tree, where all links of the selected candidate node have been processed, to iterate through the above steps for each candidate node in the candidate list and each link of each candidate node, and to compute at least one LFA to a destination node in the IS-IS area or IS-IS domain using the directly connected links in the neighbor data structure where the selected link in the LFA conforms to back up eligibility.

9. The network device of claim 8, wherein the IS-IS module is further configured to select a next neighbor node of the source node, and to run a LFA SPF computation from the selected neighbor node.

10. The network device of claim 9, wherein the IS-IS module is further configured to check whether the neighbor node provides LFA for the destination node in the IS-IS area or IS-IS domain.

11. The network device of claim 9, wherein the IS-IS module is further configured to select a further link that is an ECMP or other saved directly connected link of the neighbor node, and to check whether the selected further link is eligible to be a backup link.

12. The network device of claim 9, wherein the IS-IS module is further configured to set the selected link as LFA for the destination node.

13. The network device of claim 9, wherein the IS-IS module is further configured to add the source node to the permanent tree, and to select a next neighbor node with a shortest path as a next source node.

14. The network device of claim 8, wherein the IS-IS area or IS-IS domain has an internet protocol version 4 (IPv4) or IP version 6 (IPv6) topology including the network device and the connected nodes via the multiple parallel links.

15. A non-transitory computer-readable medium having a set of instructions stored therein, which when executed by a network device to calculate loop free alternative (LFA) for nodes in an intermediate system-intermediate system (IS-IS) area or IS-IS domain where the network device is connected with other nodes via multiple parallel links, where shortest path first (SPF) of the primary paths for the network device tracks directly connected links from each node in the IS-IS domain to the network device which is a source node for the SPF, further including instructions, which when executed by the network device cause the network device to perform a set of operations comprising:
adding the source node to a candidate list with a cost of zero;
selecting a least cost candidate node from the candidate list;
selecting a next link of the selected candidate node;
checking whether the selected candidate node is the source node;
saving the selected link in a neighbor data structure as an equal cost multi-path (ECMP) directly connected link for a node connected to other end of the selected link, where the selected candidate node is the source node;
checking whether the node connected to the other end of the selected link is in a permanent tree that is a SPF tree;
checking whether the node at the other end of the selected link is in candidate list, where the node at the other end of selected link is not in the permanent tree;
adding the node connected to the other end of the selected link to the candidate list, where the node connected to the other end of the selected link is not in the candidate list;
checking whether a cost of the selected candidate node plus a cost of the selected link is less than a cost of the node at the other end of the selected link, where the node at the other end of the link is in the candidate list;
updating the cost of the node at the other end of the selected link to the cost of the selected candidate plus the cost of the selected link, where the cost of the selected candidate node plus the cost of the selected link is less than the cost of the node at the end of the selected link;
setting the selected link as next hop of the node at the other end of the selected link, where the selected candidate node is the source node;

inheriting a selected candidate next hop to the node at the other end of the selected link, where the selected candidate node is not the source node;

moving the selected candidate node to the permanent tree, where all links of the selected candidate node have been processed;

iterating through the above steps for each candidate node in the candidate list and each link of each candidate node; and computing at least one LFA to a destination node in the IS-IS area or IS-IS domain using the directly connected links in the neighbor data structure where the selected link of the LFA conforms to back up eligibility.

16. A control plane device configured to implement at least one centralized control plane for a software defined network (SDN) including a network device, the centralized control plane configured to calculate loop free alternative (LFA) for nodes in an intermediate system-intermediate system (IS-IS) area or IS-IS domain where the network device is connected with other nodes via multiple parallel links, where shortest path first (SPF) of the primary paths for the network device tracks directly connected links from each node in the IS-IS domain or IS-IS area to the network device which is a source node for the SPF, the control plan device comprising:

a storage medium to store a topology of the IS-IS area or IS-IS domain; and a processor communicatively coupled to the storage medium, the processor configured to execute the centralized control plane software, the centralized control plane software to implement an IS-IS module, the IS-IS module configured to add the source node to a candidate list with a cost of zero, select a least cost candidate node from the candidate list, to select a next link of the selected candidate node, to check whether the selected candidate node is the source node, to save the selected link in a neighbor data structure as an equal cost multi-path (ECMP) directly connected link for a node connected to other end of the selected link, where the selected candidate node is the source node, to check whether the node connected to the other end of the selected link is in a permanent tree that is a SPF tree, to check whether the node at the other end of the selected link is in the candidate list, where the node at the other end of selected link is not in the permanent tree, to add the node connected to the other end of the selected link to the candidate list, where the node connected to the other end of the selected link is not in the candidate list, to check whether a cost of the selected candidate node plus a cost of the selected link is less than a cost of the node at the other end of the selected link, where the node at the other end of the link is in the candidate list, to update the cost of the node at the other end of the selected link to the cost of the selected candidate plus the cost of the selected link, where the cost of the selected candidate node plus the cost of the selected link is less than the cost of the node at the end of the selected link, to set the selected link as next hop of the node at the other end of the selected link, where the selected candidate node is the source node, to inherit a selected candidate next hop to the node at the other end of the selected link, where the selected candidate node is not the source node, to move the selected candidate node to the permanent tree, where all links of the selected candidate node have been processed, to iterate through the above steps for each candidate node in the candidate list and each link of each candidate node, and to compute at least one LFA to a destination node in the IS-IS area or IS-IS domain using the directly connected links in the neighbor data structure where the selected link of the LFA conforms to back up eligibility.

17. A computing device implementing a plurality of virtual machines for implementing network function virtualization (NFV), the computing device in communication with a network device, wherein a virtual machine from the plurality of virtual machines is configured to calculate loop free alternative (LFA) for nodes in an intermediate system-intermediate system (IS-IS) area or IS-IS domain where the network device is connected with other nodes via multiple parallel links, where shortest path first (SPF) of the primary paths for the network device tracks directly connected links from each node in the IS-IS domain or IS-IS area to the network device which is a source node for the SPF, the computing device comprising:

a storage medium to store an IS-IS module and a topology of the IS-IS area or IS-IS domain;

processor communicatively coupled to the storage medium, the processor configured to execute the virtual machine, where the virtual machine is configured to execute an IS-IS module, the IS-IS module configured to add the source node to a candidate list with a cost of zero, select a least cost candidate node from the candidate list, to select a next link of the selected candidate node, to check whether the selected candidate node is the source node, to save the selected link in a neighbor data structure as an equal cost multi-path (ECMP) directly connected link for a node connected to other end of the selected link, where the selected candidate node is the source node, to check whether the node connected to the other end of the selected link is in a permanent tree that is a SPF tree, to check whether the node at the other end of the selected link is in the candidate list, where the node at the other end of selected link is not in the permanent tree, to add the node connected to the other end of the selected link to the candidate list, where the node connected to the other end of the selected link is not in the candidate list, to check whether a cost of the selected candidate node plus a cost of the selected link is less than a cost of the node at the other end of the selected link, where the node at the other end of the link is in the candidate list, to update the cost of the node at the other end of the selected link to the cost of the selected candidate plus the cost of the selected link, where the cost of the selected candidate node plus the cost of the selected link is less than the cost of the node at the end of the selected link, to set the selected link as next hop of the node at the other end of the selected link, where the selected candidate node is the source node, to inherit a selected candidate next hop to the node at the other end of the selected link, where the selected candidate node is not the source node, to move the selected candidate node to the permanent tree, where all links of the selected candidate node have been processed, to iterate through the above steps for each candidate node in the candidate list and each link of each candidate node, and to compute at least one LFA to a destination node in the IS-IS area or IS-IS domain using the directly connected links in the neighbor data structure where the selected link of the LFA conforms to back up eligibility.

* * * * *